United States Patent [19]

Walker et al.

[11] Patent Number: 4,994,981

[45] Date of Patent: Feb. 19, 1991

[54] METHOD AND APPARATUS FOR CONTROLLING A POWER CONVERTER

[75] Inventors: Loren H. Walker, Salem; Russel G. Shiflett; Roy A. Carter, both of Roanoke County, all of Va.

[73] Assignee: Electric Power Research Institute, Inc., Palo Alto, Calif.

[21] Appl. No.: 251,908

[22] Filed: Sep. 30, 1988

[51] Int. Cl.⁵ .............................................. G06F 15/56
[52] U.S. Cl. .................................... 364/492; 307/125; 323/207; 364/483
[58] Field of Search ................ 364/480, 481, 483, 492; 361/78, 79, 62, 65, 88, 93; 307/125, 126, 128; 323/207

[56] References Cited

U.S. PATENT DOCUMENTS

| | | | |
|---|---|---|---|
| 4,538,231 | 8/1985 | Abe et al. | 364/492 |
| 4,581,705 | 4/1986 | Gilker et al. | 364/492 |
| 4,582,026 | 4/1986 | Takita et al. | 364/492 |
| 4,593,349 | 6/1986 | Chase et al. | 364/492 |
| 4,709,295 | 11/1987 | Yamaura et al. | 364/492 |
| 4,785,406 | 11/1988 | Lunderius et al. | 364/492 |
| 4,847,780 | 7/1989 | Gilker et al. | 364/492 |

Primary Examiner—Kevin J. Teska
Assistant Examiner—Brian Mattson
Attorney, Agent, or Firm—James B. Hinson

[57] ABSTRACT

Apparatus controls a power converter 34 to interchange power between first and second electric sources, 30 and 32. Typically the first source 30 is a standard utility bus and the second source 32 is a storage battery. A controller generates control signals in response to the utility bus voltage, to a command specifying the required power interchange and to a feedback signal indicative of the actual power being interchanged. These signals control the power converter 34 to produce the required power interchange.

12 Claims, 3 Drawing Sheets

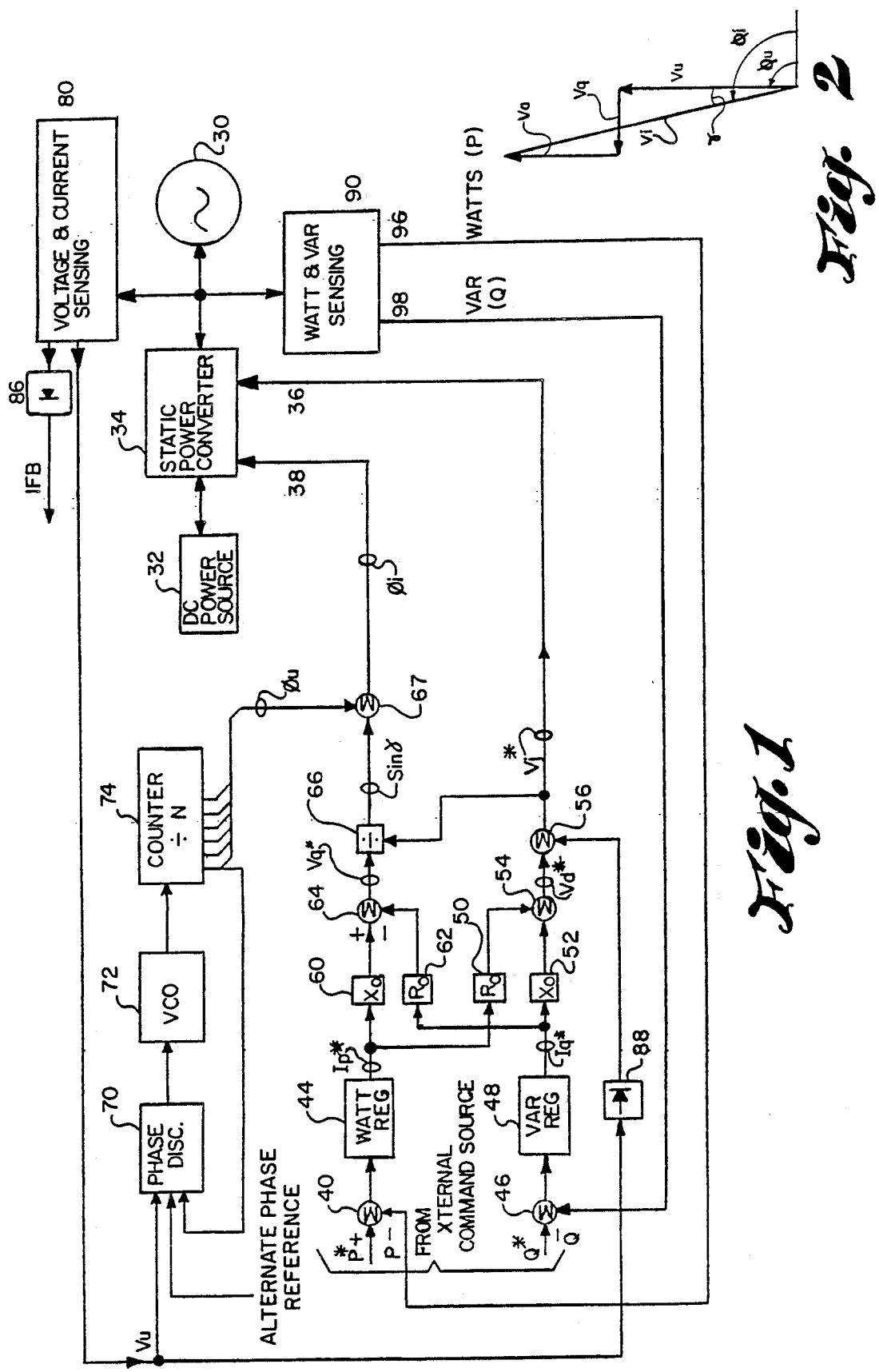

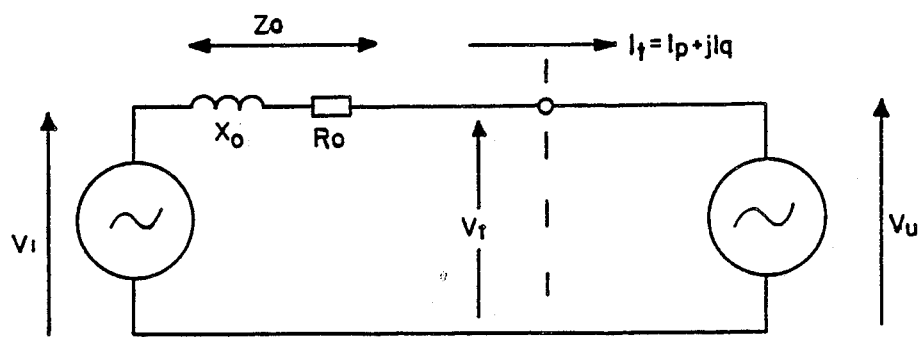
Fig. 3
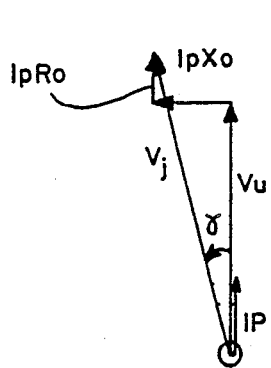 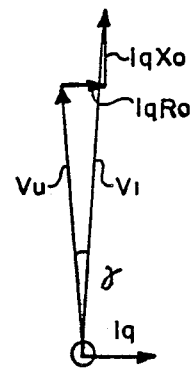 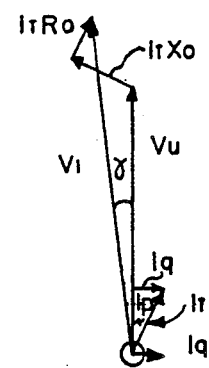
Fig. 4　　Fig. 5　　Fig. 6

METHOD AND APPARATUS FOR CONTROLLING A POWER CONVERTER

BACKGROUND OF THE INVENTION

A wide variety of prior art systems for controlling power interchange between first and second sources are available. Controllers associated with these prior art systems utilize various feedback techniques to generate the signals for controlling an associated static power converter. Interacting watt and VAR regulators associated with typical prior art controllers cause the system to respond slowly to changes. These characteristics could lead to instability and short term overload conditions. These and other undesirable features of the prior art controllers are substantially overcome by the controller which is the subject matter of this invention.

A prior art patent search was made before this patent application was prepared During the search U.S. Pat. Nos. 4,703,193; 4,363,064; 4,272,816; 4,215,736; 4,215,735; 3,988,661; 3,950,689; 3,838,330; 3,424,971; 2,872,635 and 847,974 were noted as being of interest. Of the above patents U.S. Pat. No. 4,251,736 and 4,252,735 illustrate prior art systems for interchanging electric power between two sources. Overcurrent protection is illustrated by U. S. Pat. No. 4 ,363,064. Power interchange systems which include compensation for power factor are illustrated by U. S. Pat. No. 3,838,330. Additionally U. S. Pat. No. 3,750,004 not noted during the search, illustrates a static power converter of the type useful in practicing the current invention.

SUMMARY OF THE INVENTION

The system, which is the subject of this application, provides an improved system for controlling the interchange of electrical power between first and second sources using a static power converter. The system includes a conventional static power converter coupled between first and secondd voltage sources and a controller for operating the static power converter to maintain power interchanges between the voltage sources at the desired level. {As used herein, the term "Power" is intended to include true power (called "real power") and reactive volt-amperes (called "reactive power").}

A feed forward controller which implements a mathematical model of the static power converter calculates command signals which regulate the static power converter such that its internal voltage matches an instantaneous utility voltage in amplitude and phase. Desired interchanges of real and reactive power are accomplished by modifying the magnitude and phase of the matched internal voltage generated by the static power converter.

In a typical application a static power converter regulates the interchange of power between a non-conventional energy source and a standard commercial 60 cycle AC utility bus. Non-conventional energy sources which may be used include but are not limited to photovoltaic sources, electro-chemical cells, fuel cells and superconducting magnets.

Generally, the controller responds to external command signals and produces first and second command signals which control the amplitude and phase of the voltage generated by the static power converter to assure that the desired power interchange occurs. The controller utilizes a mathematical model of the static power converter output impedance to provide for independent non-interacting control of the real and the reactive power interchanged. Decoupling of the controls permits the speed of response of the static power converter to be set by the controller at any reasonable value without encountering instability or short term overload problems.

An important feature of the controller is the rapid feed forward of the present value of utility bus voltage to adjust the commanded value of the static power converter internal voltage. This causes the internal voltage of the static power converter to follow dips or transients of the utility bus voltage, preventing static power converter overcurrents due to utility bus voltage transients.

Specifically, non-interacting calculated signals representative of the real and reactive current necessary to achieve the desired level of interchanged power are combined to generate command signals which specify the magnitude and phase of the internal voltage of the static power converter. Except for signals to limit the maximum values of command signals, feed back signals are limited to those indicating real and reactive power interchanges. Such a controller can be implemented entirely in software, entirely in hardware or a combination thereof. As indicated above, the disclosed controller may use a prior art static power converter. Thus the improved performance of the disclosed is attributable to the controller and the control techniques incorporated therein.

The static power converter and control system may be used without an auxiliary power source to provide reactive power interchange with the utility bus. The control system may also be used to control prior art AC to AC converters when used to exchange real and reactive power with a conventional AC utility bus.

DESCRIPTION OF THE DRAWINGS

FIG. 1 is a functional block diagram of the system which is the subject of this invention.

FIG. 2 is a voltage vector diagram illustrating the operation of the controller.

FIG. 3 is an equivalent circuit of the power interchange portion of the system.

FIGS. 4, 5, and 6 are vector diagrams representing the power interchange between the static power converter and the utility bus.

DETAILED DESCRIPTION

Figure 7:
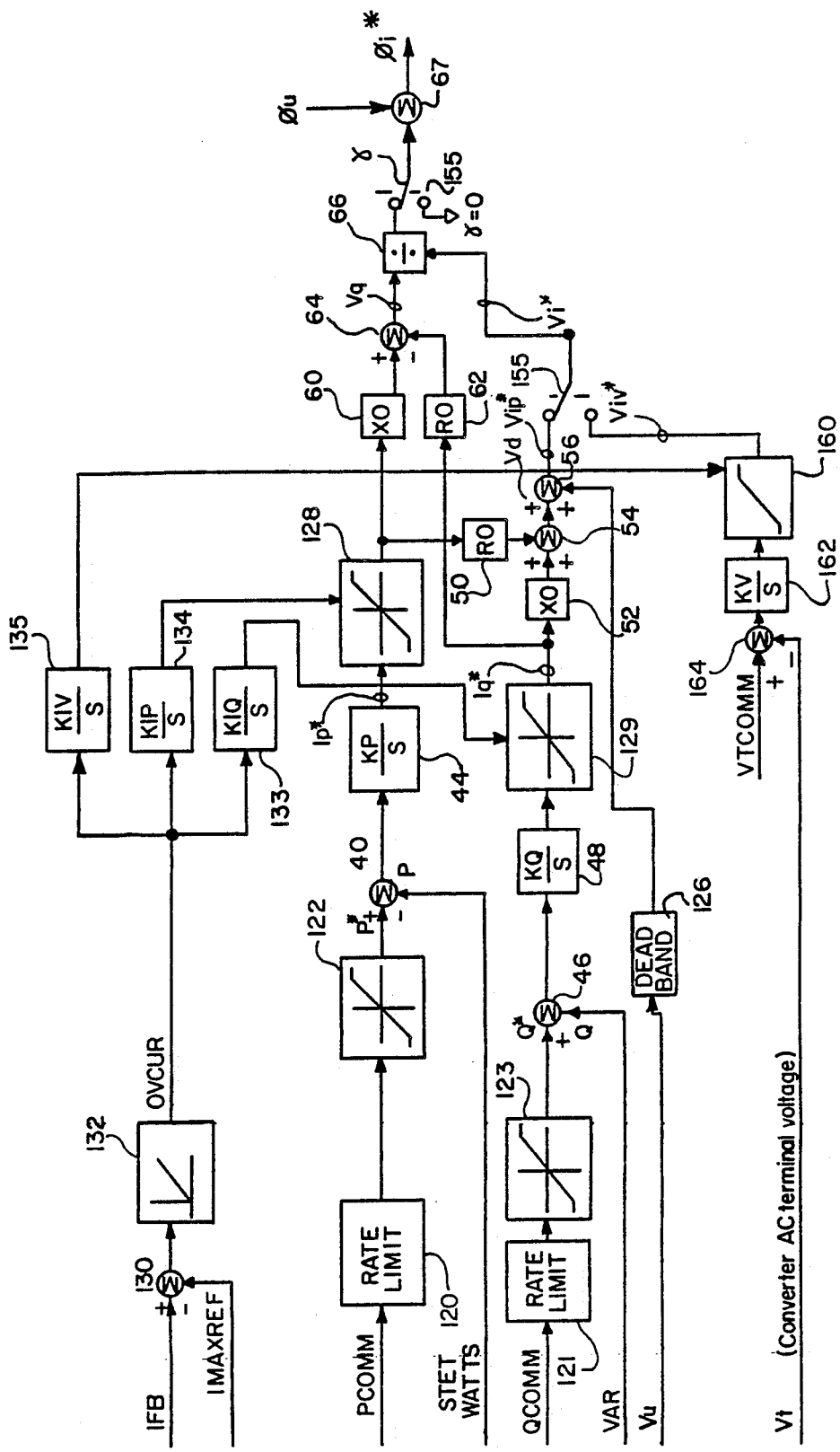
FIG. 7 is a block diagram of a second embodiment of the controller.

The system comprising the preferred embodiment of the invention is illustrated in FIG. 1 as used to interchange power between an auxiliary power source, such as DC Power Source 32, and a conventional electric utility bus 30. Voltage relationships relating to the interchange of power and an equivalent circuit of the power interchange portion of the system are respectively illustrated in FIG. 2 and FIG. 3.

Power is interchanged through a conventional bi-directional static power converter 34. Static power converter 34 may be of the general design disclosed in U.S. Pat. No. 3,750,004 or one of similar type, and may be modified to include more or fewer steps in the waveform generating portion of the system.

In this patent application a capital letter which may be followed by one or more lower case letters included in quotation marks is used to represent a variable. For example "Vi" represents the internal voltage generated by the static power converter 34. Command signals specifying a variable are represented by the variable followed by an asterisk. For example the command signal specifying the variable "Vi" is "Vi*". Additionally, for purposes of convenience the Greek letters used in the drawings are replaced with the words, "gamma" and "phi" in the text.

In order to assure that the desired power interchange between the utility bus and the auxiliary power source 32 occurs, it is necessary to control both the amplitude and phase of the internal voltage "Vi" generated by the static converter 34. To accomplish this, a voltage command signal "Vi*" specifying the voltage magnitude of the internal voltage of the static power converter 34 is coupled from the controller to the static converter 34 via a lead 36. Similarly, a phase command signal "phi i*" specifying the phase "phi i" of "Vi" is coupled to the static power converter 34 via a second lead 38. Reference is made to FIG. 6 of U.S. Pat. No. 3,750,004 illustrating a usable embodiment of the static power converter, where the signal labeled "Digital Voltage Command" corresponds to "Vi*" in the present specification, and the signal labeled "Digital Reference Ramp Command" corresponds to "phi i*" in the present specification.

A primary function of the controller utilized by the system comprising the invention, is to generate these command signals in a new and novel manner which improves the time response of the system while providing accurate control of both the real and reactive power components of the power interchanged via the static power converter 34. If the real component of the power interchanged is reduced to zero, reactive power still may be interchanged.

Feedback signals for the controller are provided by voltage and current sensors 80 and watt and VAR sensors 90. Watt and VAR sensors 90 calculate polyphase real and reactive power, producing ripple-free signals proportional to watts and VARS at the interconnection between the static power converter 34 and the utility bus 30. Watt and VAR sensors 90 are preferably of the well known cross product type. Watt and VAR signals are coupled to the controller by conductors 96 and 98.

Typically voltage and current sensors 80 sense high level AC signals and output low level AC signals. These AC output signals, proportional to voltage and current, are converted to DC signals and scaled to a suitable level by first and second AC/DC converters, 86 and 88. These AC/DC converters are preferably of a type producing zero ripple for balanced polyphase currents or voltages. Such converters can be implemented by the square root of the sum of the squares of the phase quantities. Because of the ripple-free nature of the output essentially no filters or integrators are applied to the output signals of these converters. Thus the response of the real and reactive power regulators is not limited by delays in the sensed parameters.

The controller for real and reactive power interchange acts through two sets of intermediate commands to generate the ultimate commands "Vi*" for the magnitude of internal voltage and for "phi i*" its instantaneous phase. The first set of intermediate commands specifies the real and reactive components, "Ip" and "Iq" of the interchange current "It". These intermediate current commands are designated "Ip*" and "Iq*". The second set of intermediate commands specifies the in-phase and quadrature components of the voltage across the out put impedance of the static power converter 34 and are designated "Vd*" and "Vq*". Adding "Vd*" and "Vq*" to the amplitude and phase of utility bus voltage "Vu" produces the internal voltage command "Vi*".

The relationships between voltages "Vd", "Vq", "Vi", and gamma are vectorially illustrated in FIG. 2. Voltage vectors, "Vd" and "Vq", represent the voltage across the converter output impedance "Zo". Since "Vq" is defined as the component at 90 degrees to "Vu" and "Vd" is defined as the component in phase with "Vu", practical valves of "Vq" will have only a small effect on the amplitude of the vector sum "Vi"="Vu"+"Vd"+"Vq". Calculations can be simplified by representing the magnitude of "Vi" as the scalar sum of "Vu" and "Vd". The angle between the utility phase position, "phi u", and the phase position of the internal voltage "phi i" is denoted "gamma". Phase angle "gamma" is calculated, as subsequently described.

FIG. 3 is an equivalent circuit of the power interchange portion of the system illustrated in Figure 1 Resistive element, "Ro" and a reactance, "Xo", correspond to the resistive and the reactive components of the internal impedance of the static power converter 34. The vector sum of these impedances is designated as impedance "Zo".

Connecting the static power converter 34 to the utility bus 30, as illustrated in FIG. 3, causes a power interchange corresponding to the interchange current, "It". The power interchange current is the vector sum of the real and the quadrature current components, "Ip" and "Iq". Generation of the desired power interchange current requires that the internal voltage "Vi" of the static power converter 34 have the correct amplitude and phase angle "gamma" with respect to the utility voltage. Power interchange current "It" results from a vector difference voltage "Vu"−"Vi" being imposed across the impedance "Zo". The magnitude and phase of the power interchange current "It" is determined by this voltage difference divided by the net output impedance "Zo" of the static power converter 34.

FIGS. 4 through 6 are diagrams respectively indicating the phase relationship between the internal voltage "Vi" generated by the static power converter 34 and the utility bus voltage "Vu" for situations in which real power is interchanged, reactive power is interchanged and the general case where both reactive and real power is interchanged.

More specifically, FIG. 4 illustrates the case in which substantially all of the power interchanged is real. This real power is the result of the current "Ip" in phase with voltage "Vu". This in-phase current causes a quadrature voltage component across the output reactance "IpXo" and a smaller in-phase voltage component across the resistance "IpRo". The vector sum of "Vu", "IpXo" and "IpRo" defines the correct internal voltage: of amplitude Vi and at an angle gamma from the utility bu voltage.

Similarly FIG. 5 represents the current and voltage relationships when substantially all of the power interchanged is reactive, while FIG. 6 represents the generalized case in which both real and reactive power is interchanged. The relationships illustrated in FIG. 6 are utilized by the controller comprising the invention to perform calculations and generate commands specifying the variables to be controlled.

The value of "Vi" (the magnitude of converter internal voltage) is closely approximated by:

$$"Vi" = "Vu" + "Iq"""Xo" + Ip"Ro"$$

The value of angle gamma is given by:

$$\text{gamma} = \text{Arc Sin}(("Ip"Xo" - "Iq"Ro")/"Vi")$$

The above two equations define a mathematical model of the power interchange circuit utilized by the controller to produce command signals which are linear and non-interacting.

A controller implemented in accordance with the above criteria is shown in FIG. 1 will now be discussed in detail below with reference to the above referenced phase diagrams and the equivalent circuit of the static power converter.

The command "P*" representing the desired value of real power is combined with the actual power, "P" in a first summing junction 40 to generate a difference signal. In response to this difference signal, a watt regulator 44 calculates the required real current command "Ip*". Similarly, a signal "Q*" specifying the desired reactive power is combined with the actual reactive power "Q" in a summing junction 46 to generate a signal which is utilized by a VAR regulator 48 to calculate the required reactive current command "Iq*". The transfer functions of the watt and VAR regulators may be an integral gain as subsequently discussed with reference to FIG. 7 or any other transfer function suited to such a regulator.

Calculations to produce the internal voltage command "Vi*" and the phase command "phi i*" are performed by the controller based on the real and reactive current commands "Ip*" and "Iq*". More specifically the phase voltage command "Vd*" is calculated by multiplying the real current command "Ip*" by the real component "Ro" of the internal impedance "Zo" to produce a value to which is added the product of "Iq*" and "Xo". These functions are illustrated at reference numerals 50, 52, and 54. Adding the real voltage command "Vd*" to the utility bus voltage "Vu" produces the internal voltage command "Vi*". This addition is performed by an adder 56 and provides feed forward control for compensating for changes in the utility bus voltage "Vu".

Utilizing the utility voltage as described above provides a feed forward control loop which rapidly compensates the internal voltage "Vi" of the static power converter 34 for changes in the utility bus voltage "Vu". Additionally, the use of an accurate model of the internal impedance "Zo" of the static converter 34 in calculating the internal voltage command "Vi*" reduces the interaction between the voltage and phase commands to a negligible value.

The internal voltage "Vi" of the static converter 34 is displaced by an angle "gamma" from the utility bus voltage "Vu" to create the desired power interchange relationship between the utility bus and auxiliary power source 32. To accomplish this, the real interchange current command "Ip*" and the reactive interchange current command "Iq*" are respectively multiplied by the reactive and real components, "Xo" and "Ro", of the internal impedance "Zo" by multipliers 60 and 62. A summing junction 64 combines the results of these calculations to produce the quadrature voltage command "Vq*". A divider 66 receives as inputs the internal voltage command "Vi*" and the quadrature voltage command "Vq*" and calculates the sine of the phase angle "gamma".

The signal "Sin gamma" at the output of divider 66 is regarded as equal to the angle "gamma" expressed in radians. This approximation: sin angle = angle, is a widely used one which is valid within 2% for angles up to .35 radian (20 degrees). This assumption is reasonable because gamma will not be greater than 20 degrees for most realistic values of static power converter output impedance "Zo".

A phase locked loop consisting of a phase discriminator 70, voltage control oscillator 72, and a divide by "N" counter 74 produces a high frequency reference signal phase locked to the utility bus voltage "Vu". Voltage controlled oscillator 72 operates at a high frequency to produce an output signal which is counted down to produce a signal identical in frequency and phase with the utility voltage "Vu". This signal is fed back to the discriminator 70 to control the phase locked loop.

More specifically, the counter 74 is incremented in approximately eight microsecond intervals to produce a multibit digital signal representing angle with a 1/6th degree resolution at 60 Hz. This signal is combined with the output of divider 66 in an adder 67 to produce a rapidly changing number corresponding to the instantaneous phase command "phi i" of the internal voltage "Vi" generated by the static power converter 34.

A hardware digital adder 67 in conjunction with the phase locked loop for generating "phi u" implements the phase portion of the vector diagram of FIG. 2. The inputs to adder 67 are "phi u" and "gamma" to produce at its output the value of "phi i" scaled equivalently to the high resolution number "phi u".

By contrast similar phase angle signals have been produced in prior art control systems using phase locked loops by offsetting the frequency of a voltage controlled oscillator similar to oscillator 72. This process is slower due to the settling time of the phase lock loop. Such delays reduce the ability of the controller to respond to rapid changes in load conditions. Such delays also contribute to instability problems.

As discussed above, an accurate mathematical model of the static power converter 34 output impedance is used in calculating the phase angle command "phi i*" and the internal voltage command "Vi*" Feed forward control for variation in the utility bus voltage further increases the accuracy and speed of response of the controller. These modeling and control techniques reduce the interactions of the response to commands for real and reactive current, "Ip*" and "Iq*" to negligible values. It also permits the speed of response of the controller to be set by the watt and VAR regulators, 44 and 48.

FIG. 7 an expanded embodiment of the controller illustrated in FIG. 1. Features added are:

1) current limit regulators for limiting the maximum terminal current of the static power converter to a selected value;

2) a voltage regulator function permitting the static power converter to be operated disconnected from the utility voltage bus;

3) a deadband function to improve operation of the voltage feed-forward function;

4) rate limits and command value limits on the watt and VAR commands "P*" and "Q*".

To emphasize the similarity of these embodiments, the reference numbers used to identify functions in FIG. 1 are used to identify identical functions in FIG. 7. Additionally, as with the embodiment illustrated in FIG. 1, the channels generating the commands for in-phase and quadrature currents, "Ip" and "Iq" are identical.

More specifically a real interchange power command "PCOMM" is externally provided to a rate limit device 120. The primary function of the rate limit device 120 is to remove noise and this function need not be implemented, if desired. In most applications it is desirable to place a maximum amplitude and a minimum amplitude on the real power interchanged by the static power converter 34. Such limits are imposed by a conventional limiter 122 positioned between the rate limiter 120 and a subtractor 124.

Summing junction 40 combines the limited signal representing the real power interchange command "P*" with a signal representing the real power being interchanged by the static power converter 34 to generate a difference signal. A real current command signal "Ip*" is produced by an integrator 44 in response to this difference signal. Maximum and minimum limits are imposed on the real interchange current command signal "Ip*" by a limiter 128. Integration constants of the integrator 44 determine the rate at which the real interchange current command "Ip*" responds to changes.

In controlling the static power converter 34, the output current of the static power converter 34 is measured to produce a current feedback signal "IFB" which is used as feed back to limit the interchange current "It" to an acceptable value. The signal "IFB" may be generated by voltage and current sensors 80 and AC/DC converter 86 as illustrated in FIG. 1.

Summing junction 130 combines the interchange current feedback signal "IFB" with a manually adjustable maximum current reference command signal "IMAXREF". Whenever the current output of the static power converter 34 exceeds the desired limit the output signal of the summing junction 130 is positive. Positive values of this signal are coupled through a polarity sensitive limiter 132 to produce a signal which is integrated by integrators 133, 134, and 135. Integrator 134 produces a signal which adjusts the limits of the limiter 128 to maintain the real interchange current command signal "Ip*" within the desired bounds. Integrators 133 and 135 act similarly to limit, respectively, the quadrature current command "Iq*" and the Voltage command "Viv*".

First and second multipliers 60 and 62 respectively multiply the real and reactive interchange current commands, "Ip*" and "Iq*", by, "Xo" and "Ro", to produce first and second signals which are combined in an adder 64 to produce the quadrature voltage command signal "Vq*". A number corresponding to the phase angle "gamma" is produced by dividing the quadrature voltage command signal "Vq*" by the internal voltage command "Vi*" using a divider 66 Phase angle "gamma" is added to "phi u" by adder 67 to produce "phi i*".

A quadrature power command signal "QCOMM" and a signal indicating the reactive power being interchanged, designated "VAR", are processed by a second channel consisting of functions illustrated at reference numerals 121, 123, 46, 48 and 129 which is functionally identical to the channel consisting of functions illustrated at reference numerals 120, 122, 40, 44 and 128. This second channel produces the quadrature current command "Iq*".

The value of the in-phase component of voltage drop across the converter output impedance, "Vd" is generated by multipliers 50 and 52 and adders, 54 and 56. This value of "Vd" is added to "Vu" in an adder 56 to provide the output signal designated "Vip*". A switch 155 selects "Vi*" from either the lower channel "Viv*", or "Vip*" as the internal voltage command "Vi*".

A deadband function 126 is included in the utility voltage feedforward path. This function rejects small relatively slow perturbations (less than a small value, for example 2%) of the utility voltage and passes large sudden changes of that voltage. This allows the unfiltered, fast value of sensed voltage to be input to summer 56 without a dithering of the output due to trivial variations in the sensed voltage signal "Vu".

For various reasons it may be desirable to operate the static power converter 34 disconnected from the utility bus. In this case the only control needed is to maintain the output voltage of the static power converter 34 output at the nominal voltage and frequency. Switch 155 is placed in its lower position to activate this function. The pole of switch 155 connected to the signal "gamma" sets the value of "gamma" to "zero". This allows the phase of the converter output to be controlled directly by "phi u". If the utility reference voltage "Vu" is not available, an alternate reference is supplied to phase discriminator 70 to produce "phi u".

The second pole of switch 155 allows the selection of the commanded value of internal voltage "Vi" from either the power regulating channel described above or from a second voltage regulating channel which is described below.

The value "vTCOMM" is a reference value representing the nominal AC output voltage of the static power converter 34. A summing junction 164 combines the value of this reference with the value of voltage at the AC terminals of the static power converter 34. This value "Vt" is derived by a voltage sensors (not shown) which may be identical to voltage sensors 80 and 88, illustrated in FIG. 1 The error signal at the output of summing junction 164 coupled to the input of an integrator 162 to provide an alternate command for internal converter voltage, "Viv*" at its output. This integrator 162 serves as a voltage regulator which could have transfer functions more complex than an integrator 48 used in the above described voltage regulator. Limits are imposed on the value of the internal voltage "Viv" commanded if static power converter current exceeds IMAXREF by a limiter 160. This is accomplished by the action of integrator 135 in a manner similar to integrators 134 and 133.

Either embodiment of the controller discussed above may be implemented using analog techniques, digital techniques or a combination of both. Both the embodiments illustrated in FIGS. 1 and 9 were implemented using a combination of digital hardware and software techniques.

Specifically in this embodiment the sine of gamma and the command "Vi*" are calculated using a properly programmed digital computer. As previously discussed the phase of the bus voltage "phi u" and the phase command "phi i*" are calculated using hard wired digital circuits. In all cases the details of selecting alternate implementations is believed to be within the capability of those skilled in the art.

We claim:

1. A controller for a static power converter connecting an auxiliary power source to an AC power bus operating at a selected AC voltage such that said power converter operates to selectively interchange power between said auxiliary source and said AC power bus, each having internal impedances including an internal resistance and an internal reactance component, said controller acting in response to externally generated commands for real and reactive power interchanges and producing an internal voltage command signal and a phase command signal for controlling said power converter to produce an interchange current having a selected magnitude and phase corresponding to the desired real and reactive power interchanges, said controller comprising in combination:
  a) first means for generating a signal proportional to said AC voltage of said AC power bus;
  b) second means for generating a sensed real power signal and a sensed reactive power signal indicative of the power being interchanges between said auxiliary power source and said AC power bus as a result of said interchange current;
  c) third means responsive to a real power command and to a reactive power command, said real power signal and reactive power signal to generate an in-phase current command signal and a quadrature current command signal;
  d) fourth means responsive to said in-phase current command signal, to said quadrature current command signal and to said signal proportional to the AC bus voltage of said AC power bus to generate said internal voltage command signal;
  e) fifth means responsive to said in-phase current command signal, to said quadrature current command signal and to said signal proportional too said AC voltage to generate said phase command signal.

2. The controller in accordance with claim 1 further including:
  a) sensor means to generate a signal proportional to said interchange current;
  b) means to generate a maximum interchange current reference signal;
  c) means responding to said maximum interchange current reference signal and to said signal proportional to the magnitude of said interchange current to modify said in-phase and quadrature current commands to control the magnitude of the interchange current such that said interchange current does not exceed a level specified by said maximum interchange current reference signal.

3. The controller in accordance with claim 1 wherein said fourth means includes a mathematical model of the output impedance of said static power converter which includes the resistance and the reactance components of said output impedances in calculating the in-phase current command signal and in calculating the quadrature current command signals.

4. The controller in accordance with claim 1 further including adder means for combining said signal proportional to the AC voltage of said AC power bus with said in-phase voltage command such that said internal voltage command changes linearly and without substantial delay in response to changes in said AC voltage of said AC power bus.

5. The controller in accordance with claim 1 wherein said controller includes a mathematical model of a power interchange circuit comprising said converter and said AC power bus, calculates the in-phase and quadrature voltages produced by said interchange current and utilizes said in-phase and quadrature voltages to calculate said internal voltage command and said phase command.

6. The controller in accordance with claim 5 wherein said fourth means comprises a mathematical model of said interchange circuit of said converter and said AC power bus including the internal resistance and the internal reactance of said power converter.

7. The controller in accordance with claim 1 wherein said real power signal, said reactive power signal, and said signal proportional to the AC voltage of said AC power bus have a response selected such that commands generated by said controller in response to changes in said interchange current are not adversely affected by delays in sensing these parameters.

8. The controller in accordance with claim 7 further including deadband means selectively responsive to said signal proportional to the AC voltage of said AC power bus to eliminate dither in said internal voltage command signal and said phase command signal due to insignificant changes in said AC voltage of said AC power bus.

9. A controller for a static power converter, having an internal impedance including real and reactive components, connecting an auxiliary power source to an AC power bus, said AC power bus having an AC voltage associated therewith, such that said power converter operates to selectively interchange real and reactive power through a power interchange circuit between said auxiliary source and said AC power bus, said controller acting in response to externally generated commands for real and reactive power and producing an internal voltage command signal and a phase command signal for controlling said power converter to produce an interchange current corresponding to the desired real and reactive power interchanges, said controller comprising in combination:
  a) first means for generating a signal proportional to said AC voltage;
  b) second means for generating a sensed real power signal and a sensed reactive power signal indicative of the power being interchanged between said power converter and said AC bus as a result of said interchange current;
  c) a first summing junction for combining said real power signal with a real power command signal to generate a real power difference signal;
  d) regulator means for converting said real power difference signal to a real current command signal;
  e) a second summing junction for combining said reactive power signal with a reactive power command signal to generate a reactive power difference signal;
  f) second regulator means for converting said reactive power difference signal to a quadrature current command;
  g) means for multiplying said real current command by the real component of the internal impedance of said power converter to produce a first signal, multiplying said quadrature current command by the reactive component of the internal impedance of said power converter to generate a second signal and for combining said first and second signals to generate an in-phase real voltage command signal;
  h) means for multiplying said quadrature current command by the real component of the internal impedance of said power converter to generate a third signal, multiplying said real current command by the reactive component of the internal impedance of said power converter to generate a fourth signal and for combining said third and fourth signals to produce a quadrature voltage command signal;

i) feed forward controller means for combining said in-phase voltage command signal with said signal proportional to the AC voltage of said AC power bus to produce said internal voltage command; and j) means for combining said internal voltage command signal with said quadrature voltage command signal to produce said phase command.

10. A method for producing substantially non-interacting internal voltage and phase commands for a power converter for controlling said converter to selectively interchange power through a power interchange circuit coupled between a power source and an AC power bus, including the steps of:

a) producing a mathematical model of the power interchange circuit between said power source and said AC power bus;

b) utilizing said mathematical model to calculate in-phase and quadrature voltage commands associated with said power interchange;

c) combining said in-phase and quadrature voltage commands associated with said power interchange with a signal proportional to the AC voltage of said AC power bus in a feed forward controller to generate said internal voltage and phase commands.

11. The method in accordance with claim 10 further including the step of generating real and quadrature current commands associated with said power interchange to calculate in-phase and quadrature voltage commands associated with said power interchange.

12. The method in accordance with claim 11 further inducing the step of selectively combining said in-phase and quadrature voltage commands with a signal proportional to the voltage of said AC power bus in a feed forward controller to produce said internal voltage and phase commands.

* * * * *